(12) United States Patent
Kobayashi

(10) Patent No.: US 7,452,141 B2
(45) Date of Patent: Nov. 18, 2008

(54) IMAGING DEVICE

(75) Inventor: Futoshi Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 11/323,048

(22) Filed: Dec. 30, 2005

(65) Prior Publication Data

US 2006/0159438 A1    Jul. 20, 2006

(30) Foreign Application Priority Data

Jan. 18, 2005    (JP) .............. 2005-010310

(51) Int. Cl.
*G03B 5/02*    (2006.01)
*G03B 17/00*    (2006.01)

(52) U.S. Cl. ..................... 396/349; 396/542
(58) Field of Classification Search ............... 396/348, 396/349, 542
See application file for complete search history.

(56) References Cited

U.S. PATENT DOCUMENTS

| 5,661,609 A | 8/1997 | Asakura |
| 5,739,962 A | 4/1998 | Asakura |
| 6,266,486 B1 * | 7/2001 | Kohno ................ 396/72 |

FOREIGN PATENT DOCUMENTS

| JP | 7-20370 A | 1/1995 |
| JP | 2001-188289 A | 7/2001 |

* cited by examiner

*Primary Examiner*—W. B. Perkey
(74) *Attorney, Agent, or Firm*—Canon USA Inc IP Division

(57) ABSTRACT

At least one exemplary embodiment is directed to a driving unit which has a through-hole that guides a flexible printed board. A position of the flexible printed board with respect to the driving unit changes in an optic-axial direction in accordance with rotation of the driving unit, reducing the occurrence of image ghost caused by the flexible printed board.

3 Claims, 9 Drawing Sheets

IMAGING DEVICE

BACKGROUND OF THE INVENTION

1. Field of the Invention

The present invention relates to an imaging device having a flexible printed board, and more particularly although not exclusively, an imaging device having a flexible printed board disposed in a lens barrel equipped with a movable member.

2. Description of the Related Art

There is a conventional collapsible lens barrel that includes a device for shifting an optical lens, which enables storing the optical lens in a camera body when a camera is not used and shifting the optical lens to a predetermined extended position when the camera is used.

Furthermore, there is a conventional zoom lens barrel that can shift a plurality of optical lens in an optic-axial direction to change a focal distance of a photographing lens.

Furthermore, there is a conventional lens barrel that has both collapsing and zooming capabilities.

According to one of such lens barrels, a diaphragm or a shutter is driven by an electromagnetic device and is arranged to shift back and forth in an optic-axial direction together with an optical lens. An electromagnetic driving section that shifts in the optic-axial direction must be electrically connected to a stationary camera controller equipped in the camera body. This is the reason why a flexible printed board is used to connect the electromagnetic driving section to the camera controller.

The flexible printed board can bend or flex to follow a displacement or shifting of the electromagnetic driving section and accordingly allows the electromagnetic driving section to shift to a desired position while maintaining electrical connection between the electromagnetic driving section and the camera controller.

In addition to a diaphragm or a shutter, an actuator for a vibration-correction lens barrel can be housed in a lens barrel. The actuator causes the lens to shift in a plane substantially perpendicular to an optical axis to cancel camera shake. A sensor measuring the temperature can be equipped in the lens barrel. The actuator and/or the sensor can be integrated with an optical group shifting in a lens barrel. Also in such cases, the actuator and/or the sensor can be connected via a flexible printed board to a camera controller of a camera body.

The length of a flexible printed board is determined considering both a most collapsed position and a most extended position of a lens barrel. Hence, the flexible printed board in the lens barrel is usually in a bent or deflected state and accordingly can produce a ghost on an image because the flexible printed board is possibly positioned in the vicinity of an imaging beam.

The cause or mechanism of such a ghost will be described with reference to FIG. 10.

FIG. 10 is a transversal cross-sectional view showing a conventional lens barrel in an intermediate state between a wide angle state and a telephoto state. A flexible printed board 101 shown in FIG. 10 is configured to electrically connect an electromagnetic driving source of a diaphragm and/or a shutter equipped in a lens barrel to a camera controller provided outside the lens barrel. Furthermore, FIG. 10 shows an imaging element 102 having an imaging plane, a first lens group 103, a second lens group 104, a third lens group 105, and a light beam 106.

As shown in FIG. 10, the light beam 106 passes through the first lens group 103 and the second lens group 104 while causing refractions in the first lens group 103 and the second lens group 104, respectively. According to the arrangement shown in FIG. 10, the light beam 106 can be reflected, depending on its incident angle, at the flexible printed board 101 bent in the lens barrel. Then, the light beam 106 can reach the imaging element 102 after passing through the third lens group 105. If a light source of the light beam coming from outside of a target area is bright enough, the light beam 106, including any reflection from the flexible printed board 101, can cause a ghost on a photographed image.

To reduce the occurrence of the light beam causing a ghost due to the above-described interference with the flexible printed board in the path passing through respective lenses before reaching the imaging element, there is no method other than eliminating the reflection of light from the flexible printed board. To this end, various methods have been discussed to reduce or eliminate an excessive length of the flexible printed board.

For example, Japanese Patent Laid-open Application No. 07-20370 discusses a method of moving back and forth a guide member guiding a flexible printed board in an optic-axial direction to eliminate or reduce the excessive length.

Furthermore, Japanese Patent Laid-open Application No. 2001-188289 discusses a guide roller around which a flexible printed board is wound, in which the guide roller is shifted back and forth in accordance with a back-and-forth shifting movement of a shutter unit connected to the flexible printed board so as to eliminate or reduce the excessive length.

However, according to the arrangement discussed in Japanese Patent Laid-open Application No. 07-20370, a space for allowing the guide member to move in the optic-axial direction must be secured. Thus, downsizing the lens barrel is difficult and facilitates the inclusion of a member for shifting the guide member. This fails to facilitate downsizing the lens barrel. Besides, an additional number of parts are required which increase the manufacturing cost.

Moreover, according to the arrangement discussed in Japanese Patent Laid-open Application No. 2001-188289, both the guide roller and a member for shifting the guide roller are required which increase the manufacturing cost. Furthermore, a moving space for the guide roller is required and accordingly downsizing the lens barrel is difficult.

SUMMARY OF THE INVENTION

At least one exemplary embodiment is directed to a guide mechanism that is configured, without requiring additional parts and a large space, to reduce or eliminate an excessive length of the flexible printed board.

At least one exemplary embodiment is directed to an imaging device that is configured to facilitate the rolling the flexible printed board in a smaller space without additional parts or components.

In at least one exemplary embodiment, an imaging device includes: a body unit equipped with a control circuit board; a shifting member equipped with an electromagnetic driving section and/or an electric component and configured to shift in an optic-axial direction relative to the body unit; a flexible printed board configured to connect the electromagnetic driving section and/or the electric component to the control circuit board; a driving unit that rotates to drive the shifting member; and a through-hole of the driving unit that guides the flexible printed board and is formed in such a manner that a through position of the flexible printed board with respect to the driving unit changes in the optic-axial direction in accordance with rotation of the driving unit.

In at least one exemplary embodiment, an imaging device includes: a body unit equipped with a control circuit board; a shifting member equipped with an electromagnetic driving section and/or an electric component and configured to shift in an optic-axial direction relative to the body unit; a flexible printed board configured to connect the electromagnetic driving section and/or the electric component to the control circuit board; a rotary unit that rotates to drive the shifting member; and a shifting cam barrel provided inside the rotary unit and configured to shift in the optic-axial direction relative to the body unit, where the rotary unit has a through-hole for guiding the flexible printed board and an engaging portion that engages with a driving pin of the shifting cam barrel, and the through-hole for guiding the flexible printed board has a round configuration at a portion where the through-hole and the engaging portion intersect with each other.

Further features of the present invention will become apparent from the following detailed description of exemplary embodiments with reference to attached drawings.

BRIEF DESCRIPTION OF THE DRAWINGS

The accompanying drawings, which are incorporated in and constitute a part of the specification, illustrate exemplary embodiments of the invention.

DETAILED DESCRIPTION OF THE EMBODIMENTS

Figure 1:
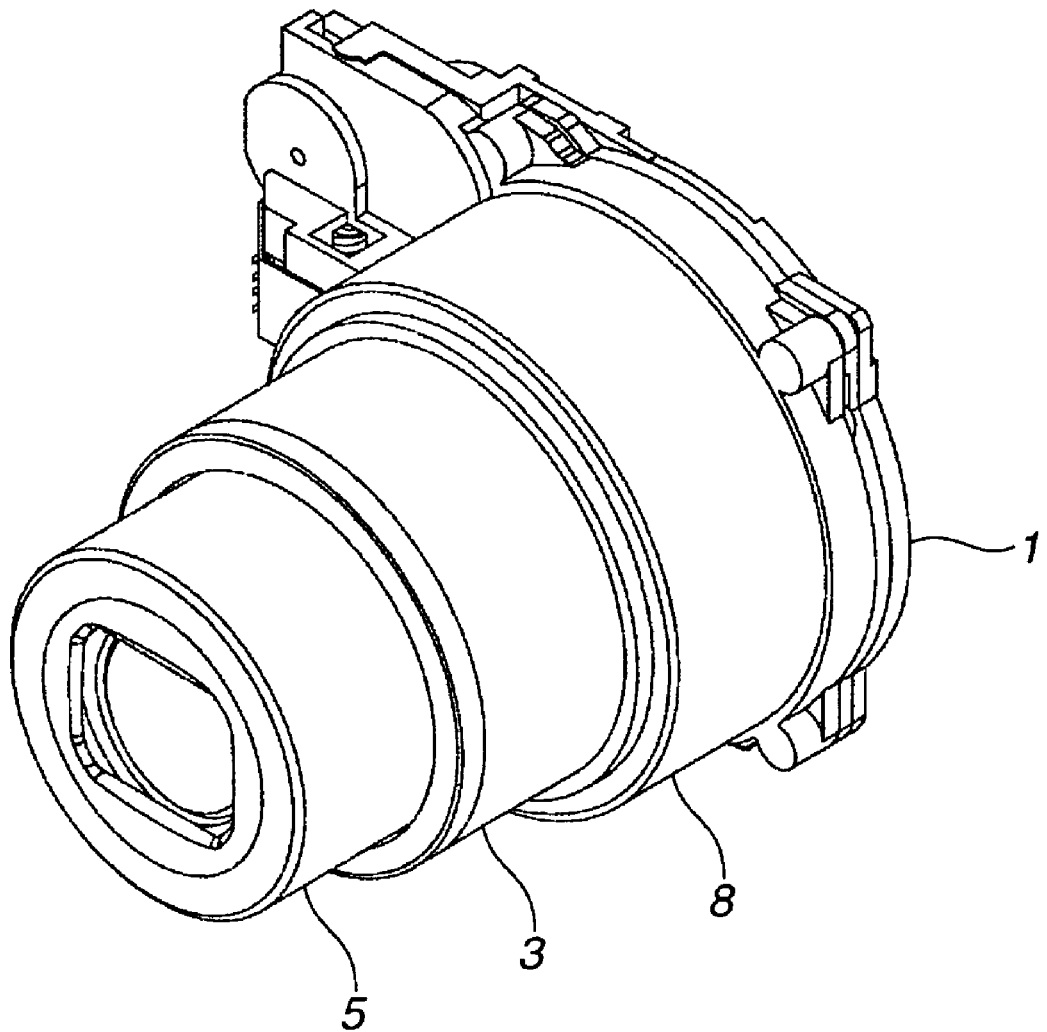
FIG. 1 is a perspective view showing an appearance of a lens barrel in a wide angle state in accordance with at least one exemplary embodiment.

The following description of exemplary embodiment(s) is merely illustrative in nature and is in no way intended to limit the invention, its application, or uses.

Exemplary embodiments can be incorporated into various imaging devices (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g., optical photographic systems), for example the system can be designed for use with infrared and other wavelength imaging systems or any apparatus of device using flexible printed boards. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Exemplary embodiments of the invention will be described in detail below with reference to the drawings.

FIG. 1 is a perspective view showing a lens barrel in accordance with at least one exemplary embodiment. The lens barrel shown in FIG. 1 is in a wide angle state where the focal distance is the shortest. The lens barrel, as described later, is shiftable from a collapsed state where the lens barrel is stored to a telephoto state where the focal distance is the longest or to the wide angle state.

Furthermore, the lens barrel can be arranged in such a manner that the focal distance continuously changes between the wide angle state and the telephoto state. This is generally referred to as "zoom." A cam mechanism can be used to perform shifting or zooming of the lens barrel to each state so that later-described optical lens groups are positioned with predetermined clearances. Details of a shifting and/or zooming operation of the lens barrel will be described in the following.

Figure 2:
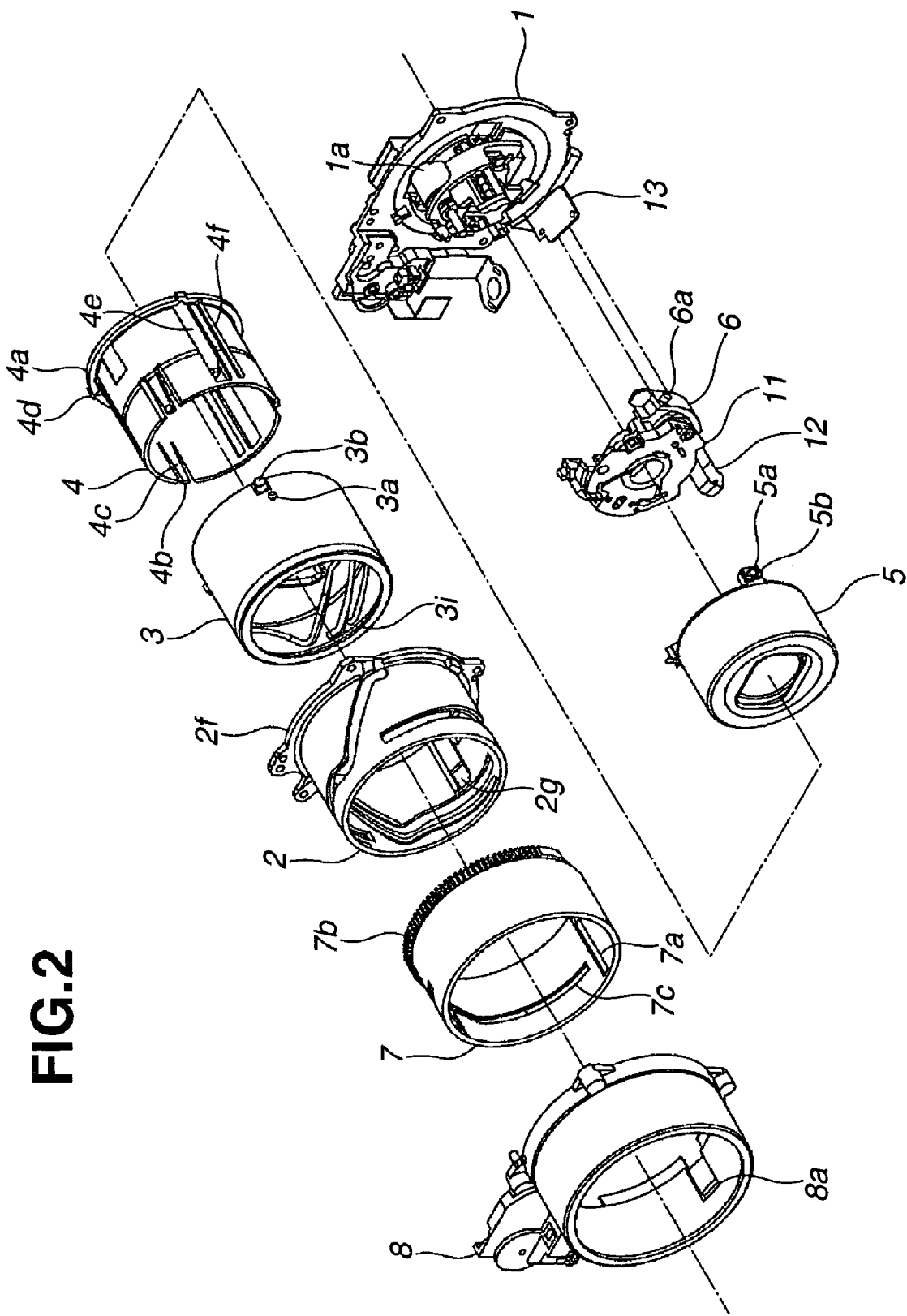
FIG. 2 is an exploded perspective view showing a detailed arrangement of the lens barrel in accordance with at least one exemplary embodiment.

FIG. 2 is an exploded perspective view showing a detailed arrangement of the lens barrel according to at least one exemplary embodiment. A ground plate 1 holds a third lens group and an imaging element. The third lens group can include a focusing lens and is shiftable in the optic-axial direction. The ground plate 1 is a rearmost component constituting the lens barrel. Other constituent components are disposed in front of the ground plate 1. An AF motor 1a can be an actuator operatively connected to the ground plate 1. The AF motor 1a drives the third lens group back and forth in the optic-axial direction.

A stationary barrel 2, (e.g., having a cylindrical shape), is operatively connected to the ground plate 1 in such a manner that the third lens group is coaxial with the cylindrical body. Thus, a central line of the stationary barrel 2 agrees with the optical axis of the third lens group. The stationary barrel 2 can have an inner cylindrical surface on which a groove configuration constituting a cam is formed.

Furthermore, the stationary barrel 2 can have a hole configuration substantially identical with the groove track. The hole configuration extends through from the inner cylindrical surface to an outer cylindrical surface of the stationary barrel 2.

Figure 3A:
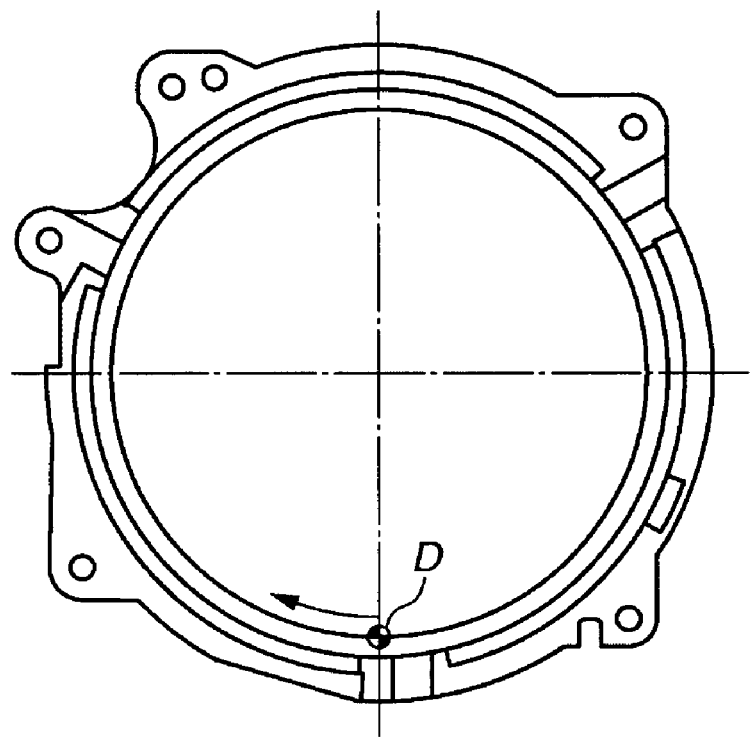
FIG. 3A is a front view showing a stationary barrel of the lens barrel in accordance with at least one exemplary embodiment.

The groove configuration and the hole configuration will be described with reference to FIGS. 3A and 3B in the following. FIG. 3A shows a front side of the stationary barrel 2.

Figure 3B:
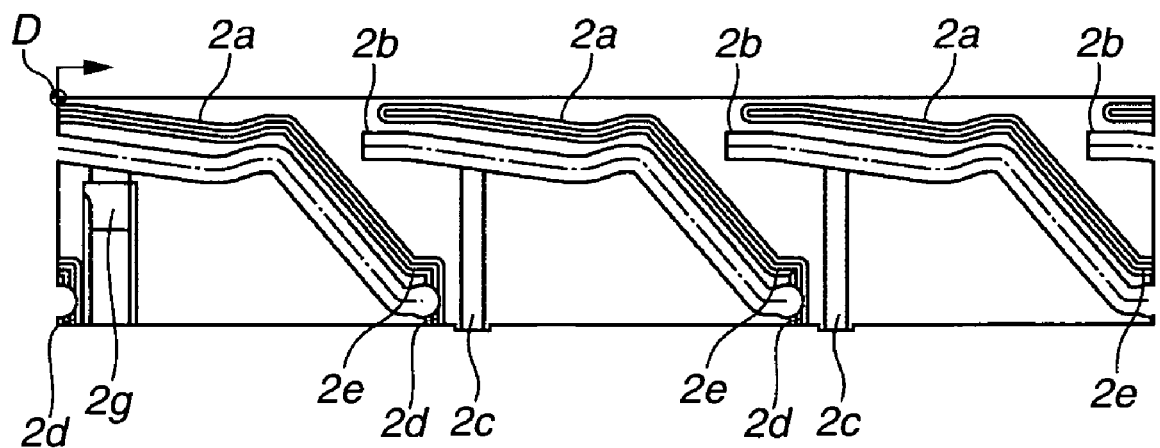
FIG. 3B is a developed view showing an internal structure of the stationary barrel in accordance with at least one exemplary embodiment.

FIG. 3B shows a circumferential inner side of the stationary barrel 2. FIG. 3A shows an arrow starting from a reference point "D." The clockwise direction indicated by the arrow corresponds to the right direction in FIG. 3B.

In FIG. 3B, a stationary barrel cam groove 2a has a groove configuration acting as a cam. Although not limited in exemplary embodiments the example illustrated shows a total of three cam grooves 2a, each having the same configuration, provided on the inner cylindrical surface of the stationary barrel 2 and disposed at the same intervals in the circumferential direction. A through cam hole 2b forms a hole configuration (e.g., having a track similar to the stationary barrel cam groove 2a). The through cam hole 2b penetrates from the inner cylindrical surface to the outer cylindrical surface of the stationary barrel 2. Like the stationary barrel cam grooves 2a the example illustrated shows a total of three cam holes 2b, each having the same configuration, and disposed at the same intervals in the circumferential direction.

Returning to FIG. 2, a shifting cam barrel 3 has a cylindrical shape with two kinds of cam grooves formed on the inner surface. A total of three cam followers 3a are provided on an outer cylindrical surface of the shifting cam barrel 3 at the same intervals in the circumferential direction as the spacing of the cam holes 2b of the stationary barrel 2. Each cam follower 3a engages with a corresponding stationary barrel cam groove 2a. An advancement regulating barrel 4, having a cylindrical shape, can be coupled with an inner cylindrical surface of the shifting cam barrel 3. A rear end portion of the advancement regulating barrel 4 is configured to be a flange 4a. Stopper projections 4b are formed at a front end portion of the advancement regulating barrel 4.

Each stopper projection 4b protrudes outward from the cylindrical surface coupled with the shifting cam barrel 3. The stopper projection 4b is provided at a distal end portion of an arm 4c. The other end of the arm 4c is connected to the advancement regulating barrel 4. An annular groove 3i (e.g., having an annular recessed shape), is provided on the inner cylindrical surface of the shifting cam barrel 3 at a distal end portion thereof. The present exemplary embodiment shows three stopper projections 4b and corresponding arms 4c disposed at equal intervals in the circumferential direction. However, the function is facilitated by having at least one stopper projection 4b and a corresponding arm 4c.

The advancement regulating barrel 4 is inserted into the shifting cam barrel 3 from the rear side. In the beginning of an inserting process, the stopper projection 4b is brought into contact with the inner cylindrical surface of the shifting cam barrel 3. Under a pressing force, the arm 4c undergoes an elastic deformation and leans inward. Thus, the stopper projection 4b can advance into the shifting cam barrel 3. Furthermore, in the succeeding insertion process, the stopper projection 4b reaches the annular groove 3i.

Upon reaching this position, the arm 4c springs back to the original shape from an elastically deformed condition. Thus, the stopper projections 4b enter into and engage with the annular groove 3i. With the engagement, the shifting cam barrel 3 is firmly sandwiched between the flange 4a and the stopper projections 4b in the optic-axial direction. The advancement regulating barrel 4 prevents the shifting cam barrel 3 from shifting in the optic-axial direction. Meanwhile, the advancement regulating barrel 4 facilitates the rotation of the shifting cam barrel 3 about the optical axis.

A method for assembling the shifting cam barrel 3 and the advancement regulating barrel 4 into the stationary barrel 2 will be described in the following.

In FIG. 3B, each advance groove 2c is provided on the inner cylindrical surface of the stationary barrel 2. The advance groove 2c has a groove configuration substantially parallel to the optical axis. A stationary barrel introducing cam 2d, that forms a part of the stationary barrel cam groove 2a, is substantially parallel to the optical axis. A stationary barrel collapsing cam 2e is connected to the stationary barrel introducing cam 2d. The stationary barrel collapsing cam 2e extends in a substantially circumferential direction about the optical axis, and supports the shifting cam barrel 3 at a position where the lens barrel is collapsed.

Returning to FIG. 2, advance keys 4d are formed on an outer cylindrical surface of the flange 4a. The advance key 4d and the advance groove 2c have substantially the same width, and engage with each other as described later. The lens barrel of the present exemplary embodiment can have two advance grooves 2c and two advance keys 4d. However, the function is facilitated by having at least one pair of the advance groove 2c and the advance keys 4d and exemplary embodiments are not limited to two advanced grooves.

The shifting cam barrel 3, in a condition that the advancement regulating barrel 4 is rotatably coupled, can be assembled with the stationary barrel 2 from a rear end thereof. First, the cam follower 3a is engaged with the stationary barrel introducing cam 2d and pushed in the optic-axial direction. Contemporaneously, the advancement regulating barrel 4 is rotated until the advance key 4d engages with the advance groove 2c. The cam follower 3a is further pressed until the cam follower 3a reaches the stationary barrel collapsing cam 2e. Thus, the cam follower 3a and the stationary barrel cam groove 2a engage with each other. The advance key 4d and the advance groove 2c engage with each other.

As a result, the shifting cam barrel 3 and the advancement regulating barrel 4 are assembled with the stationary barrel 2. Furthermore, the cam followers 3a engage with the stationary barrel cam grooves 2a disposed at three portions in the circumferential direction. Therefore, the shifting cam barrel 3 is operatively connected in a position relative to the stationary barrel 2.

A total of three driving pins 3b are provided on the outer cylindrical surface of the shifting cam barrel 3 at equal intervals in the circumferential direction. Each driving pin 3b, inserted in the through cam hole 2b, protrudes outward from the outer cylindrical surface of the stationary barrel 2.

Therefore, in the condition that the shifting cam barrel 3 is assembled with the stationary barrel 2, the driving pin 3b is tightened with a screw (not shown) attached to the driving pin 3b. The width of the through cam hole 2b is greater than the diameter of the driving pin 3b. The track of the stationary barrel cam groove 2a is similar to the track of the through cam hole 2b. Therefore, the driving pin 3b does not interfere with the edge of the through cam hole 2b.

A method for assembling the first lens group and the second lens group will be described in the following.

In FIG. 2, a first lens group lens barrel 5 holds the first lens group. A second lens group lens barrel 6 holds the second lens group. Each of the first lens group lens barrel 5 and the second lens group lens barrel 6 engages with a cam provided on the inner cylindrical surface of the shifting cam barrel 3 and also engages with an advance groove of the advancement regulating barrel 4.

Figure 4:
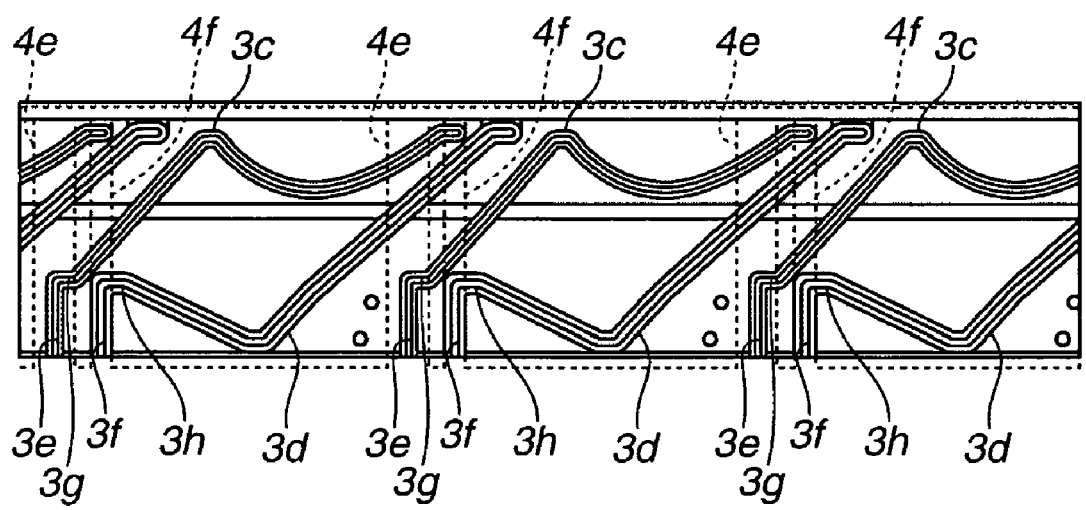
FIG. 4 is a developed view showing an internal structure of a shifting cam barrel of the lens barrel in accordance with at least one exemplary embodiment.

First lens group cam followers 5a are provided on the outer cylindrical surface of the first lens group lens barrel 5. A total of three cam followers 5a are disposed at equal intervals in the circumferential direction. The first lens group cam follower 5a engages with a first lens group cam groove 3c (FIG. 4).

First lens group advance keys 5b are provided on the outer cylindrical surface of the first lens group lens barrel 5. A total of three advance keys 5b are disposed at equal intervals in the circumferential direction similar to the first lens group cam followers 5a.

The first lens group advance keys 5b and the first lens group cam followers 5a are located at the same circumferential positions. First lens group advance grooves 4e (FIGS. 2 and 4), each having a hole configuration and extending substantially in parallel with the optical axis, are provided on the advancement regulating barrel 4. A total of three advance grooves 4e are disposed at equal intervals in the circumferential direction. The width of the first lens group advance key 5b is substantially identical with the width of the first lens group advance groove 4e. The first lens group advance key 5b and the first lens group advance groove 4e engage with each other.

Second lens group cam followers 6a are provided on the outer cylindrical surface of the second lens group lens barrel 6. A total of three cam followers 6a are disposed at equal intervals in the circumferential direction. The second lens group cam follower 6a engages with a second lens group cam groove 3d (FIG. 4).

Second lens group advance grooves 4f, each having a hole configuration and extending substantially in parallel with the optical axis, are provided on the advancement regulating barrel 4. A total of three advance grooves 4f are disposed at equal intervals in the circumferential direction. The diameter of the second lens group cam follower 6a is substantially identical with the width of the second lens group advance groove 4f. The second lens group cam follower 6a and the second lens group advance groove 4f engage with each other.

Various cams formed on the inner cylindrical surface of the shifting cam barrel 3 will be described with reference to FIG. 4.

FIG. 4 is a developed view showing an internal structure of the shifting cam barrel 3. First lens group cam grooves 3c, each having the same configuration, can function as a cam that shifts the first lens group lens barrel 5 to a first predetermined position in the optic-axial direction. Second lens group cam grooves 3d, each having the same configuration, can function as a cam that shifts the second lens group lens barrel 6 to a second predetermined position in the optic-axial direction. A total of three pairs of the first lens group cam groove 3c and the second lens group cam groove 3d are disposed on the inner cylindrical surface of the shifting cam barrel 3 at equal intervals in the circumferential direction.

First lens group introducing cams 3e, each having groove configuration and extending substantially in parallel with the optical axis, are connected at one end thereof to the first lens group cam grooves 3c. The first lens group introducing cams 3e and the first lens group cam groove 3c can be substantially identical in the cross-sectional configuration (e.g., the cross-section in a plane perpendicular to the page containing FIG. 4 and perpendicular to the respective cam path 3e or 3c).

Similarly, second lens group introducing cams 3f, each having the same groove configuration and extending substantially in parallel with the optical axis, are connected at one end thereof to the second lens group cam grooves 3d. The second lens group introducing cams 3f and the second lens group cam groove 3d are substantially identical in the cross-sectional configuration (e.g., the cross-section in a plane perpendicular to the page containing FIG. 4 and perpendicular to the respective cam path 3d or 3f).

Furthermore, a first lens group collapsing cam 3g extends in the circumferential direction and is connected at one end thereof to the first lens group introducing cam 3e. The first lens group collapsing cam 3g functions as a part of the first lens group cam groove 3c. In the condition that the first lens group cam follower 5a and the first lens group collapsing cam 3g are engaged with each other, the position of the first lens group lens barrel 5 relative to the shifting cam barrel 3 in the optic-axial direction is a collapsed position where the lens barrel is in a stored condition.

Similarly, a second lens group collapsing cam 3h extends in the circumferential direction and is connected at one end thereof to the second lens group introducing cam 3f. The second lens group collapsing cam 3h functions as a part of the second lens group cam groove 3d. In the condition that the second lens group cam follower 6a and the second lens group collapsing cam 3h are engaged with each other, the position of the second lens group lens barrel 6 relative to the shifting cam barrel 3 in the optic-axial direction is a collapsed position where the lens barrel is in a stored condition.

When the first lens group lens barrel 5 is assembled into the shifting cam barrel 3 and also into the advancement regulating barrel 4, the shifting cam barrel 3 and the advancement regulating barrel 4 are mutually rotated so that the first lens group introducing cam 3e agrees with the first lens group advance groove 4e in phase (i.e., in circumferential position). A broken line of FIG. 4 represents a development of the advancement regulating barrel 4 (although the arm 4c is omitted).

Furthermore, the shifting cam barrel 3 and the advancement regulating barrel 4 shown in FIG. 4 are in a phase relationship suitable for assembling the first lens group lens barrel 5. Maintaining such a phase relationship enables the first lens group cam follower 5a to engage with the first lens group introducing cam 3e and simultaneously enables the first lens group advance key 5b to engage with the first lens group advance groove 4e.

The first lens group lens barrel 5 can be squeezed until it reaches the first lens group collapsing cam 3g. Accordingly, the first lens group lens barrel 5 can be assembled with the shifting cam barrel 3. Furthermore, the first lens group cam followers 5a engage with the first lens group cam grooves 3c disposed at three portions spaced in the circumferential direction. Thus, the first lens group lens barrel 5 is operatively connected in a position relative to the shifting cam barrel 3.

The second lens group lens barrel 6 is assembled in the same manner.

When the second lens group lens barrel 6 is assembled into the shifting cam barrel 3 and also into the advancement regulating barrel 4, the shifting cam barrel 3 and the advancement regulating barrel 4 are mutually rotated so that the second lens group introducing cam 3f agrees with the second lens group advance groove 4f in phase (i.e. in circumferential position). According to the lens barrel of the present exemplary embodiment, the assembling phase of the first lens group lens barrel 5 is similar to the assembling phase of the second lens group lens barrel 6.

More specifically, as shown in FIG. 4, the second lens group introducing cam 3f and the second lens group advance groove 4f can be in the same phase if the above-described phase relationship for assembling the first lens group lens barrel 5 is to be satisfied. Maintaining such a phase relationship enables the second lens group cam follower 6a to engage with the second lens group introducing cam 3f and simultaneously enables the second lens group cam follower 6a to engage with the second lens group advance groove 4f.

The second lens group lens barrel 6 can be squeezed until it reaches the second lens group collapsing cam 3h. Accordingly, the second lens group lens barrel 6 can be assembled with the shifting cam barrel 3. Furthermore, the second lens group cam followers 6a engage with the second lens group cam grooves 3d disposed at three portions spaced in the circumferential direction. Thus, the second lens group lens barrel 6 is operatively connected in a position relative to the shifting cam barrel 3.

A diaphragm shutter unit equipped in the second lens group lens barrel 6 will be described in the following.

In the second lens group lens barrel, a diaphragm is positioned in the vicinity of the second lens group.

Figure 6:
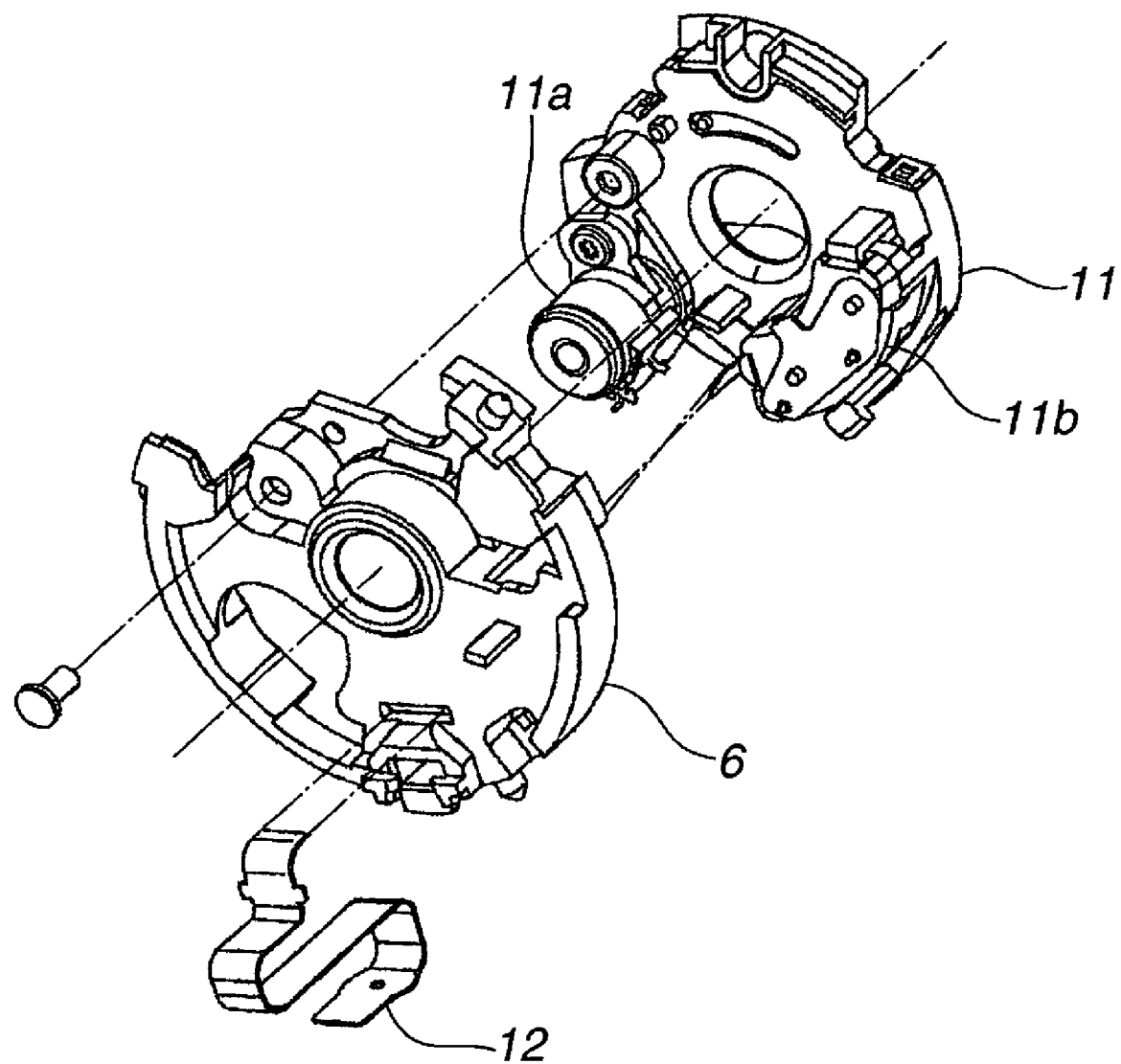
FIG. 6 is an exploded perspective view showing a second lens group lens barrel and a diaphragm shutter unit in accordance with at least one exemplary embodiment.

FIG. 6 is an exploded perspective view showing the second lens group lens barrel 6 seen from a rear side of the lens barrel. A diaphragm shutter unit 11 has an iris diaphragm and a shutter. The iris diaphragm has a variable aperture. A stepper motor 11*a* is a driving source that changes the diaphragm aperture.

An actuator 11*b* generates an electromagnetic force for driving the shutter. A diaphragm shutter driving flexible printed board (hereinafter, referred to as diaphragm shutter FPC) 12 is provided for electrically connecting the stepper motor 11*a* and the actuator 11*b* to an external device provided outside the lens barrel. The diaphragm shutter FPC 12 is connected by soldering to the stepper motor 11*a* and to the actuator 11*b*. The diaphragm shutter unit 11 is operatively connected to the second lens group lens barrel 6 (e.g., with fastening screws), and is integrated with the second lens group lens barrel 6.

Returning to FIG. 2, a driving barrel 7 is coupled around the outer cylindrical surface of the stationary barrel 2. The driving barrel 7 has a cylindrical body that is rotatable relative to the stationary barrel 2. Three driving key grooves 7*a* are provided on the inner cylindrical surface of the driving barrel 7 at equal intervals in the circumferential direction. Each driving key groove 7*a* has a groove configuration substantially parallel to the optical axis. The width of the driving key groove 7*a* is substantially identical with the diameter of the driving pin 3*b*. The driving key groove 7*a* and the driving pin 3*b* engage with each other. A driving barrel gear 7*b*, provided on the outer cylindrical surface of the driving barrel 7, meshes with a gear of a later-described driving system.

A flange 2*f*, provided at the rear end of the stationary barrel 2, has a flat surface substantially perpendicular to the optical axis. The driving barrel 7 is assembled with the stationary barrel 2 from the front side until the driving barrel 7 is brought into contact with the flange 2*f* at the phase determined by the positional relationship between the driving barrel gear 7*b* and the driving pin 3*b*.

A cover barrel 8 is a stopper of the driving barrel 7. The cover barrel 8 is operatively connected to the ground plate 1 (e.g., with fastening screws via the flange 2*f* of the stationary barrel 2). A semi-finished product of the lens barrel including the above-described members ranging from the ground plate 1 to the driving barrel 7 is assembled with the cover barrel 8 from the rear side.

A flexible printed board (hereinafter, referred to as lens barrel FPC) 13 is connected to a DC motor 9, the AF motor 1*a*, and other electric components equipped in the lens barrel. The lens barrel FPC 13 has a connector connected to the diaphragm shutter FPC 12. The lens barrel FPC 13 is further connected to a main circuit (not shown) of the imaging device (e.g., camera) body. The lens barrel FPC 13 facilitates driving each actuator of the lens barrel based on an output of an image device controller of the main circuit or inputting information from other electric components of the lens barrel to the image device controller.

Connection of the diaphragm shutter FPC 12 provided in the second lens group lens barrel 6 and the lens barrel FPC 13 provided outside the second lens group lens barrel 6 will be described in the following.

In FIG. 2, a stationary barrel FPC hole 2*g* having a hole configuration is provided on a side surface of the stationary barrel 2. The diaphragm shutter FPC 12 is inserted into the stationary barrel FPC hole 2*g*. The driving barrel 7 has an FPC slit 7*c*.

The FPC slit 7*c* overlaps with the stationary barrel FPC hole 2*g* when the driving barrel 7 is assembled with the stationary barrel 2. The driving barrel 7 is rotatable, while the diaphragm shutter FPC is integrated with the second lens group lens barrel 6 and is not rotatable. The FPC slit 7*c* can have an elongate hole configuration extending in the circumferential direction. The configuration of FPC slit 7*c* will be described later. The cover barrel 8 has a cover barrel FPC hole 8*a* provided on a side surface thereof. The cover barrel FPC hole 8*a* overlaps with the stationary barrel FPC hole 2*g*.

In this manner, the stationary barrel FPC hole 2*g*, the cover barrel FPC hole 8*a*, and the FPC slit 7*c* are overlapped with each other. Thus, the diaphragm shutter FPC 12 can be directly inserted from the inside of the lens barrel. In this case, one can set the widths of the stationary barrel FPC hole 2*g*, the FPC slit 7*c*, and the cover barrel FPC hole 8*a* to become larger in this order in the optic-axial direction. When the diaphragm shutter FPC 12 is inserted into the stationary barrel FPC hole 2*g* positioned at an innermost side, the diaphragm shutter FPC 12 can be smoothly guided to the outside of the lens barrel without interfering with the FPC slit 7*c* and the cover barrel FPC hole 8*a*.

The configuration of the FPC slit 7*c* will be described in the following.

Figure 8:
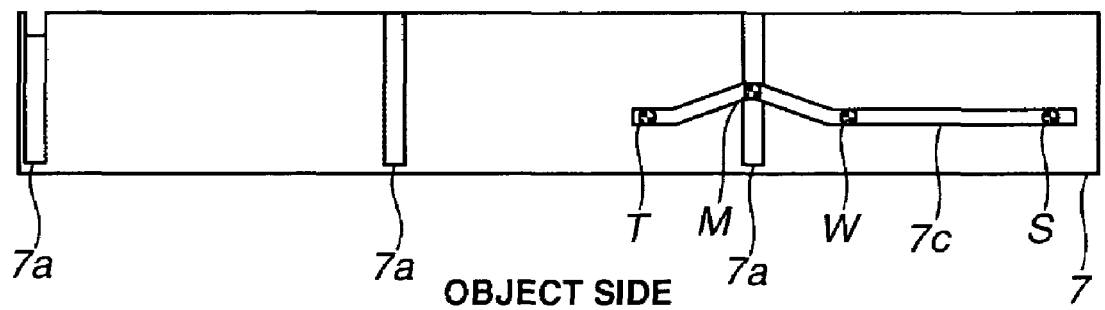
FIG. 8 is a developed view showing an internal structure of a driving barrel of the lens barrel in accordance with at least one exemplary embodiment.

FIG. 8 is a developed view showing an internal structure of the driving barrel 7. Rotation of the driving barrel 7 corresponds to a right-and-left direction in the developed view. Rotation of the driving barrel 7 and an extended state of the lens barrel are in a later-described relationship.

In FIG. 8, "S" represents a point where the diaphragm shutter FPC 12 is inserted into the FPC slit 7*c* in the collapsed state of the lens barrel. In the collapsed state of the lens barrel, the diaphragm shutter FPC 12 has an excessive or residual part and accordingly causes a bending or deflection. Similarly, "W" represents a point where the diaphragm shutter FPC 12 is inserted into the FPC slit 7*c* in the wide angle state of the lens barrel. "T" represents a point where the diaphragm shutter FPC 12 is inserted into the FPC slit 7*c* in the telephoto state of the lens barrel. Furthermore, "M" represents a point where the diaphragm shutter FPC 12 is inserted into the FPC slit 7*c* in a middle state corresponding to a midpoint between the wide angle state and the telephoto state.

As shown in FIG. 8, the FPC slit 7*c* has a same height at each of the collapsed state, the wide angle state, and the telephoto state in the optic-axial direction. On the other hand, the height of the FPC slit 7*c* can be smaller at the middle state. In other words, the FPC slit 7*c* has a configuration protruding toward the imaging plane side (FIG. 8). The slit portion of the middle state is smoothly connected to the slit portions of the wide angle state and the telephoto state via inclined slit portions.

Furthermore, as shown in FIG. 8, the driving key 7*a* and the FPC slit 7*c* intersect with each other. Thus, a round or chamfered configuration (e.g., a so-called R configuration) is formed at the intersecting point so that the diaphragm shutter FPC 12 can be smoothly shifted.

Returning to FIG. 2, the cover barrel 8 has a holding portion. A gear train of a driving system of the lens barrel is held between the holding portion of the cover barrel 8 and the ground plate 1.

Figure 5:
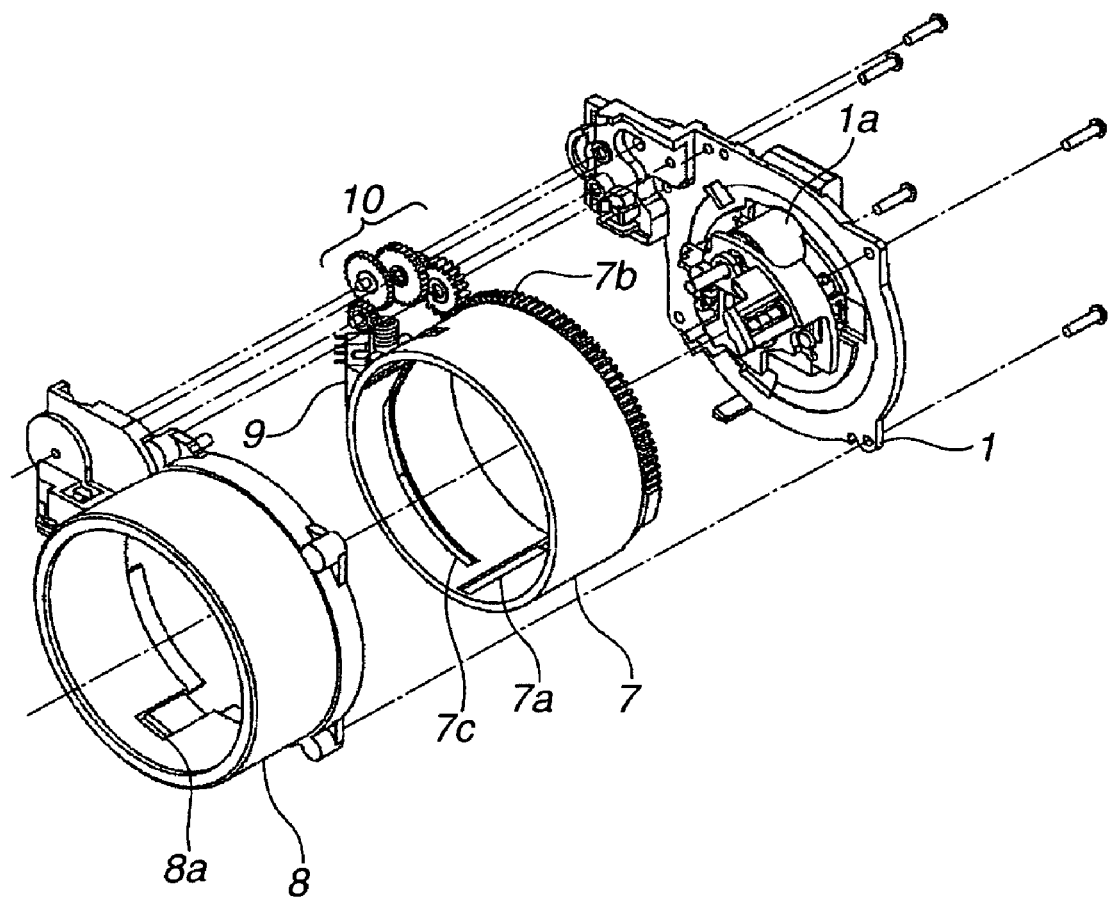
FIG. 5 is an exploded perspective view showing a driving system of the lens barrel in accordance with at least one exemplary embodiment.

FIG. 5 is an exploded perspective view showing a detailed arrangement of the driving system. The DC motor 9, acting as a driving source of the lens barrel, is operatively connected to the cover barrel 8. A gear train 10 transmits the rotation of the DC motor 9 to the driving barrel 7. The gear train 10 is held between the ground plate 1 and the cover barrel 8. In assembling processes, the ground plate 1 is finally operatively connected to the cover barrel 8 (e.g., with fastening screws). The diaphragm shutter FPC 12 is connected to the lens barrel FPC 13, before the lens barrel is completed.

An operation of the DC motor 9 for driving the lens barrel will be described in the following.

First, as described above, a rotational force of the DC motor 9 is transmitted via the gear train 10 to the driving barrel gear 7*b*. Accordingly, the driving barrel 7 rotates about the optical axis. The rotational force of the driving barrel 7 acts on the driving pins 3*b* that are engaged with the driving barrel key grooves 7*a*. Thus, the shifting cam barrel 3 rotates about the optical axis.

With the rotational force, the shifting cam barrel 3 not only rotates about the optical axis but also shifts in the optic-axial direction along the stationary barrel cam grooves 2*a* with the engagement of the cam followers 3*a* and the stationary barrel cam grooves 2*a* (FIG. 3B). Furthermore, at this moment, the advancement regulating barrel 4 does not rotate because the advance grooves 2*c* are engaged with the advance keys 4*d*. The advancement regulating barrel 4 shifts back and forth together with the shifting cam barrel 3 in the optic-axial direction.

The first lens group lens barrel 5 does not rotate because the first lens group advance keys 5*b* are engaged with the first lens group advance grooves 4*e*. As the shifting cam barrel 3 causes a rotation relative to the stationary first lens group lens barrel 5, the first lens group lens barrel 5 shifts in the optic-axial direction along the first lens group cam grooves 3*c* (FIG. 4). In this case, the shifting cam barrel 3 shifts in the optic-axial direction as described above. Thus, the first lens group lens barrel 5 shifts along a track resulting from a combination of the optic-axial shift movement along the first lens group cam grooves 3*c* and the back-and-forth movement of the shifting cam barrel 3.

Similarly, the second lens group lens barrel 6 does not rotate because the second lens group cam followers 6*a* are engaged with the second lens group advance grooves 4*f* (FIG. 4). As the shifting cam barrel 3 causes a rotation relative to the stationary second lens group lens barrel 6, the second lens group lens barrel 6 shifts in the optic-axial direction along the second lens group cam grooves 3*d*. In this case, the shifting cam barrel 3 shifts in the optic-axial direction as described above. Thus, the second lens group lens barrel 6 shifts along a track resulting from a combination of the optic-axial shift movement along the second lens group cam grooves 3*d* (FIG. 4) and the back-and-forth movement of the shifting cam barrel 3.

The advance keys 4*d* and the first lens group advance grooves 4*e* are in such a phase relationship that the first lens group cam followers 5*a* engage with the first lens group collapsing cams 3*g* when the cam followers 3*a* of the shifting cam barrel 3 are engaged with the stationary barrel collapsing cams 2*e*. Similarly, the advance keys 4*d* and the second lens group advance grooves 4*f* are in such a phase relationship that the second lens group cam followers 6*a* engage with the second lens group collapsing cams 3*h* when the cam followers 3*a* of the shifting cam barrel 3 are engaged with the stationary barrel collapsing cams 2*e*.

With this arrangement, the shifting cam barrel 3, the first lens group lens barrel 5, and the second lens group lens barrel 6 can simultaneously be located at the collapsed position.

Furthermore, at the middle state corresponding to a midpoint between the wide angle state and the telephoto state, respective cams cause the focal distance to change continuously.

From the foregoing description, it is apparent, when the driving barrel 7 rotates, that the first lens group lens barrel 5 and the second lens group lens barrel 6 can shift in the optic-axial direction in accordance with a predetermined positional relationship defined by the cams. More specifically, the lens barrel of this exemplary embodiment is shiftable between the collapsed state and the wide angle state. Furthermore, photography is feasible at each of the wide angle, the telephoto, and the middle states.

A relationship of the diaphragm shutter FPC 12, the stationary barrel FPC hole 2*g*, the cover barrel FPC hole 8*a*, and the FPC slit 7*c* will be described with reference to cross-sectional views.

FIGS. 7A to 7D are cross-sectional views respectively showing a state of the lens barrel of the present exemplary embodiment seen from a lateral direction, taken along a plane passing through a portion where the diaphragm shutter FPC 12 is inserted.

Figure 7A:
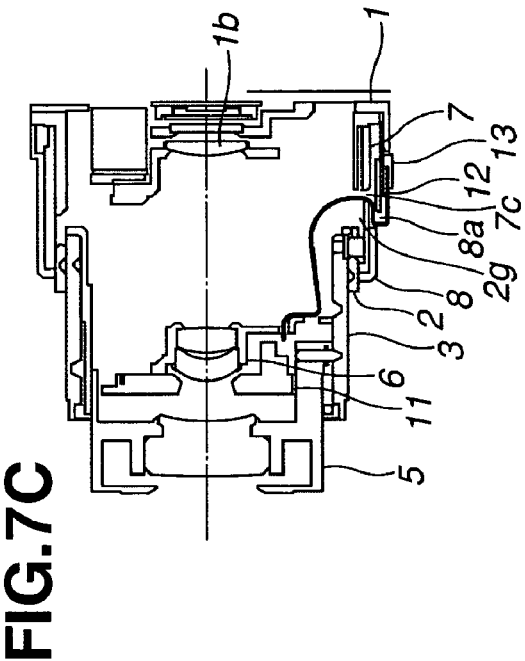
FIGS. 7A to 7D are cross-sectional views each showing a deflected state of a flexible printed board (FPC) for driving a diaphragm shutter in accordance with at least one exemplary embodiment.

FIG. 7A is a cross-sectional view showing the collapsed state of the lens barrel. As shown in FIG. 7A, the diaphragm shutter FPC 12 extends from the second lens group lens barrel 6 in the lens barrel to the outer side of the shifting cam barrel 3 via a gap between the ground plate 1 and the shifting cam barrel 3. The diaphragm shutter FPC 12 further extends forward along the inner side of the stationary barrel 2. Then, the diaphragm shutter FPC 12 passes through the stationary barrel FPC hole 2*g*, the FPC slit 7*c*, and the cover barrel FPC hole 8*a* and reaches the outside of the lens barrel, where the diaphragm shutter FPC 12 is connected to the connector of the lens barrel FPC 13.

The diaphragm shutter FPC 12, if its length is excessively long or short at the collapsed state, possibly interferes with other members in the lens barrel. Thus, the diaphragm shutter FPC 12 can be broken. Accordingly, the diaphragm shutter FPC 12 should have an appropriate length so that the diaphragm shutter FPC 12 can be prevented from being excessively long or short at the collapsed state.

Figure 7B:
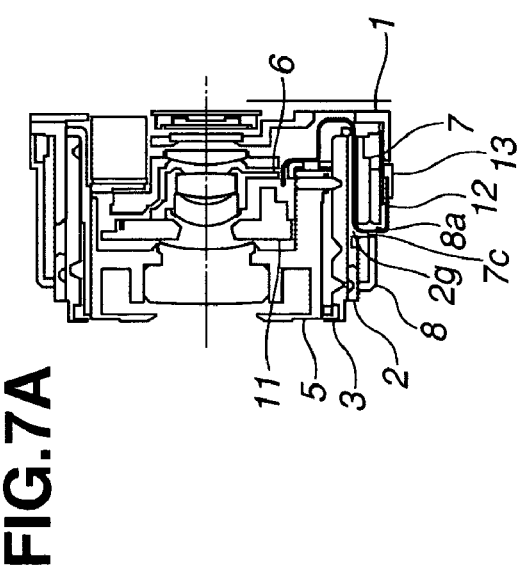

FIG. 7B is a cross-sectional view showing the wide angle state of the lens barrel. According to the lens barrel of the present exemplary embodiment, the second lens group lens barrel 6 in the wide angle state is in a position closest to an imaging plane, between the wide angle state and the telephoto state except for the collapsed state. In this condition, the diaphragm shutter FPC 12 has an excessive or residual part and accordingly causes a bending or deflection in the lens barrel.

However, there is a significant clearance between the first lens group lens barrel 5 and the second lens group lens barrel 6. The second lens group lens barrel 6 connected to the diaphragm shutter FPC 12 is positioned in the vicinity of the imaging plane. Namely, according to the present exemplary embodiment, the second lens group lens barrel 6 is close to a focusing lens 1*b* positioned at the imaging plane side. There is no substantial space S1 between the second lens group lens barrel 6 and the focusing lens 1*b*. The excessive or residual part of the diaphragm shutter FPC 12 (i.e., the deflected portion of the diaphragm shutter FPC 12) is out of the light beam (i.e., optical axis) passing through the optical first lens group. Thus, no light reflection by the diaphragm shutter FPC 12 occurs and accordingly no optical problem arises.

Figure 7C:
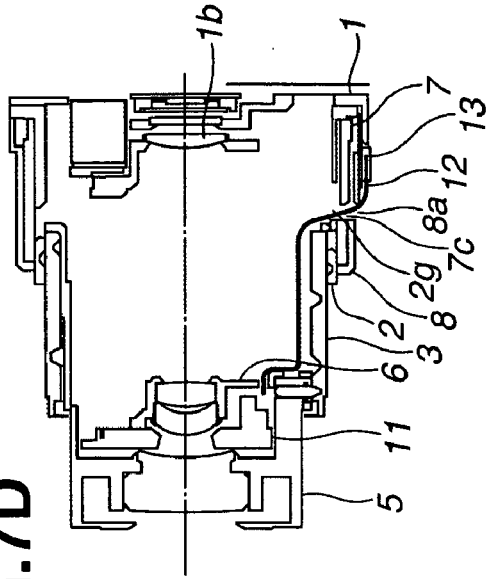

FIG. 7C is a cross-sectional view showing the middle state (e.g., the mid state approximately between the wide angle state and the telephoto state) of the lens barrel. In the middle state, the diaphragm shutter FPC 12 passes at the height of point M of the FPC slit 7c shown in FIG. 8. Accordingly, the diaphragm shutter FPC 12 bends or deflects between the driving barrel 7 and the cover barrel 8. The deflection amount of the diaphragm shutter FPC 12 in the lens barrel is smaller compared with a case where the FPC slit 7c in the middle state has the same height as in other states.

The arrangement of the present exemplary embodiment enables securing a space between the second lens group lens barrel 6 and the focusing lens 1b positioned at the imaging plane side. In a case where the diaphragm shutter FPC 12 has an excessive length compared with that in the telephoto state, the bent or deflected portion of the diaphragm shutter FPC 12 can be positioned far from the optical axis. Thus, the light beam that passes through the optical first lens group and the second lens group is not reflected by the diaphragm shutter FPC 12 and accordingly no ghost is produced or any resultant ghost is significantly reduced.

Figure 7D:
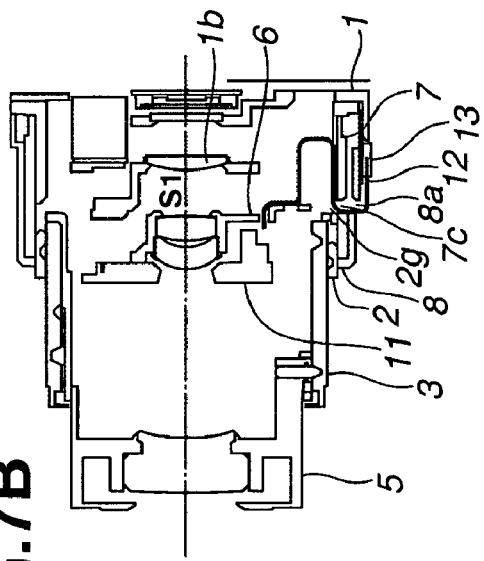

FIG. 7D is a cross-sectional view showing the telephoto state of the lens barrel. According to the lens barrel of the present exemplary embodiment, the second lens group lens barrel 6 is positioned at a most extended point in the telephoto state. Therefore, the length of the diaphragm shutter FPC 12 should be longer than the span of the extended lens barrel in the telephoto state.

As apparent from the foregoing, the diaphragm shutter FPC 12 has an excessive or residual length in the middle state (FIG. 7C) as described above because the length of the diaphragm shutter FPC 12 is set to be neither too long for the collapsed state nor too short for the telephoto state as described above. As the diaphragm shutter FPC 12 is tight in the telephoto state, the diaphragm shutter FPC 12 is kept far from the optical axis. Thus, no optical problem arises.

As described above, the lens barrel of the present exemplary embodiment enables rolling the flexible printed board in a smaller space without additional parts or components.

Figure 9:
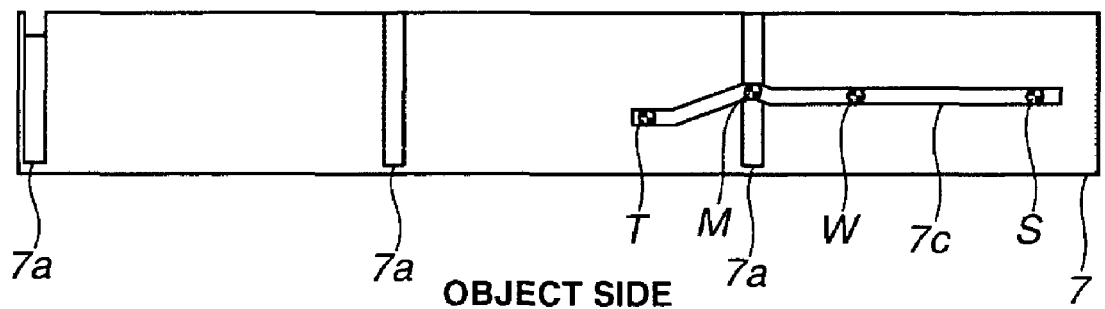
FIG. 9 is a developed view showing an internal structure of a driving barrel of the lens barrel in accordance with at least one exemplary embodiment.
Figure 10:
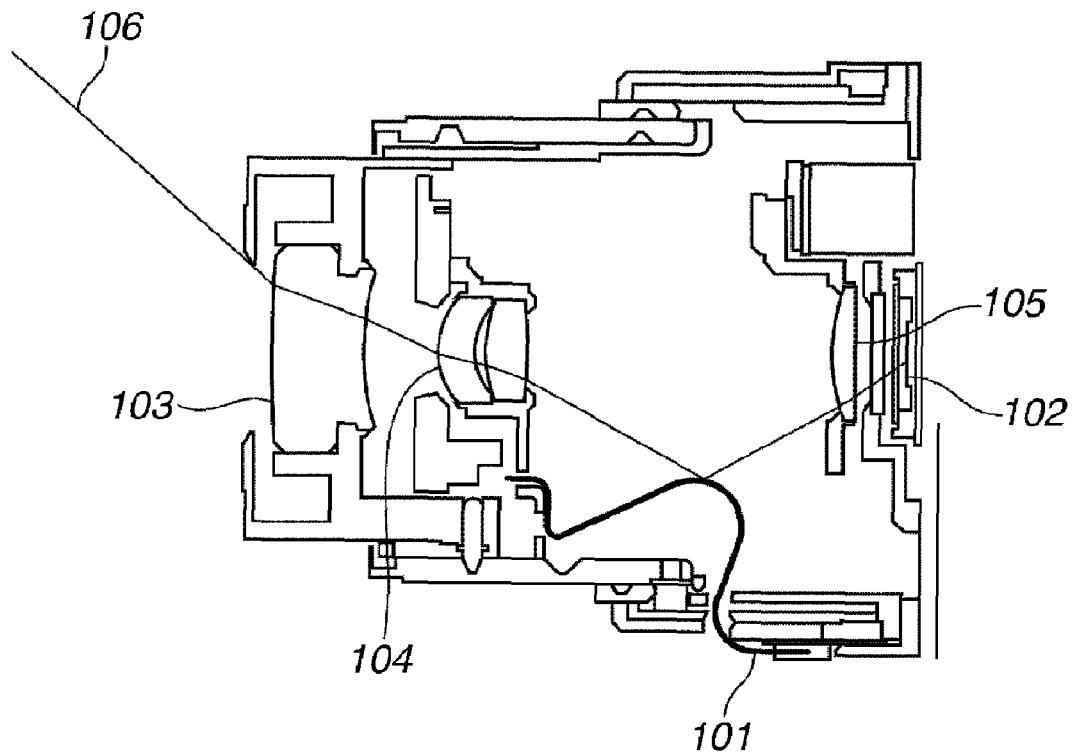
FIG. 10 is a cross-sectional view showing a conventional lens barrel that causes a ghost.

According to the present exemplary embodiment, the FPC slit 7c protrudes toward the imaging plane side at the middle state M as described above. Alternatively, as shown in FIG. 9, the FPC slit 7c can be configured to shift from the imaging plane side to the object side in accordance with extension of the second lens group lens barrel 6. In this case, even if a shifting amount of the FPC slit 7c from the imaging plane side to the object side is smaller compared with an extended amount of the second lens group lens barrel 6, in a case where no substantial space is present between the second lens group lens barrel 6 and the focusing lens 1b, bending or deflection of the diaphragm shutter FPC 12 causes little or no ghost as described above.

Although the flexible printed board of the present exemplary embodiment is used to connect the diaphragm shutter unit inside the lens barrel to the external image device controller, the flexible printed board of the present exemplary embodiment can be used to drive a vibration-correction mechanism that reduces camera shake instead of the diaphragm shutter unit. Furthermore, in a case where the optical first lens group is moved by an actuator relative to the first lens group lens barrel 5, the flexible printed board can be used to connect the actuator to the controller. Moreover, in a case where a temperature sensor or a photo-interrupter is disposed in the lens barrel, the flexible printed board can be used to connect these members to an external device.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims priority from Japanese Patent Application No. 2005-010310 filed Jan. 18, 2005, which is hereby incorporated by reference herein in its entirety.

What is claimed is:

1. An imaging device comprising:
a body unit equipped with a control circuit board;
a shifting member equipped with an electric component, wherein the shifting member is configured to shift in an optic-axial direction relative to the body unit;
a flexible printed board configured to connect the electric component to the control circuit board;
a rotary unit that rotates to drive the shifting member; and
a shifting cam barrel provided inside the rotary unit and configured to shift in the optic-axial direction relative to the body unit,
wherein the rotary unit has a through-hole for guiding the flexible printed board and an engaging portion that engages with a driving pin of the shifting cam barrel, and
the through-hole for guiding the flexible printed board has a round configuration at a portion where the through-hole and the engaging portion intersect with each other.

2. The imaging device according to claim 1, wherein the through-hole is formed in such a manner that a position of the flexible printed board with respect to the rotary unit changes in the optic-axial direction in accordance with rotation of the rotary unit.

3. The image device according to claim 1, wherein the electric component is an electromagnetic drive section.

* * * * *